US012718536B2

(12) United States Patent
Szelejewski et al.

(10) Patent No.: US 12,718,536 B2
(45) Date of Patent: Aug. 25, 2026

(54) MACHINE LEARNING MODEL FOR OCCUPANCY DETECTION

(71) Applicant: Kontakt.io Inc., New York, NY (US)

(72) Inventors: Lukasz Pawel Szelejewski, Cracow (PL); Dawid Wieslaw Crivelli, Bielsko-Biala (PL); Rom Eizenberg, New York, NY (US); Philipp Gustav Kurt Wolfgang Freiherr von und zu Gilsa, New York, NY (US)

(73) Assignee: Kontakt.io Inc., New York, NY (US)

( * ) Notice: Subject to any disclaimer, the term of this patent is extended or adjusted under 35 U.S.C. 154(b) by 364 days.

(21) Appl. No.: 18/296,316

(22) Filed: Apr. 5, 2023

(65) Prior Publication Data

US 2023/0326192 A1 Oct. 12, 2023

Related U.S. Application Data

(60) Provisional application No. 63/328,430, filed on Apr. 7, 2022.

(51) Int. Cl.

| | |
|---|---|
| ***G06V 10/776*** | (2022.01) |
| ***G06T 7/292*** | (2017.01) |
| ***G06V 10/26*** | (2022.01) |
| ***G06V 10/30*** | (2022.01) |
| ***G06V 10/774*** | (2022.01) |
| ***G06V 20/52*** | (2022.01) |

(52) U.S. Cl.

CPC ........... *G06V 10/776* (2022.01); *G06T 7/292* (2017.01); *G06V 10/26* (2022.01); *G06V 10/30* (2022.01);

(Continued)

(58) Field of Classification Search

CPC ...... G06V 10/776; G06V 10/26; G06V 10/30; G06V 10/774; G06V 20/52; G06V 10/143;

(Continued)

(56) References Cited

U.S. PATENT DOCUMENTS

| | | | | |
|---|---|---|---|---|
| 2020/0089967 | A1* | 3/2020 | Velipasalar | G06T 3/4046 |
| 2021/0208002 | A1* | 7/2021 | Meggers | G01K 3/06 |

(Continued)

OTHER PUBLICATIONS

Gomez, Andres, Francesco Conti, and Luca Benini. "Thermal image-based CNN's for ultra-low power people recognition." Proceedings of the 15th ACM international conference on computing frontiers. 2018. (Year: 2018).*

(Continued)

*Primary Examiner* — Andrew M Moyer
(74) *Attorney, Agent, or Firm* — Fenwick & West LLP

(57) ABSTRACT

The occupancy detection system for determining an occupancy count of a room is presented. The occupancy detection system may include a thermal camera, sensor array, transceiver, central processing unit (CPU), memory, occupancy detection module, and network connection module. The thermal camera may capture thermal data which includes heat signatures generated by objects present in the room. The thermal data may be provided as input to the occupancy detection module. The occupancy detection module may preprocess the thermal data and apply machine-learned models to the thermal data to predict heat signatures generated by humans. The occupancy detection system determines the occupancy count based on the number of human generated heat signatures. The occupancy detection system may broadcast the occupancy of the room over the network to one or more client devices.

20 Claims, 6 Drawing Sheets

(52) U.S. Cl.
CPC ............ *G06V 10/774* (2022.01); *G06V 20/52* (2022.01); *G06T 2207/10016* (2013.01); *G06T 2207/20081* (2013.01); *G06T 2207/30196* (2013.01); *G06T 2207/30242* (2013.01)

(58) Field of Classification Search
CPC ........ G06V 10/62; G06V 40/10; G06T 7/292; G06T 2207/10016; G06T 2207/20081; G06T 2207/30196; G06T 2207/30242; G06T 2207/10048; G06T 2207/20084; G06T 2207/30232; G06T 2207/30241; G06T 7/11; G06T 7/20
See application file for complete search history.

(56) References Cited

U.S. PATENT DOCUMENTS

| | | | | |
|---|---|---|---|---|
| 2023/0160598 | A1* | 5/2023 | Nilsson | F24F 11/63 700/276 |
| 2023/0314227 | A1* | 10/2023 | Persegol | G01J 5/0066 250/338.1 |

OTHER PUBLICATIONS

Tse, Rita, et al. "Privacy aware crowd-counting using thermal cameras." Twelfth International Conference on Digital Image Processing (ICDIP 2020). vol. 11519. SPIE, 2020. (Year: 2020).*
Ding, Meng, et al. "Action recognition of individuals on an airport apron based on tracking bounding boxes of the thermal infrared target." Infrared Physics & Technology 117 (2021): 103859. (Year: 2021).*
Bernardin, K., et al., "Evaluating Multiple Object Tracking Performance: The CLEAR MOT Metrics." EURASIP Journal on Image and Video Processing, vol. 2008, May 18, 2008, pp. 1-10.
Matias, J., "GAPOC-B Shutterless: Shutterless Light." Lynred by Sofradir & Ulis, Nov. 16, 2020, pp. 1-7.
Ristani, E., et al., "Performance Measures and a Data Set for Multi-Target, Multi-Camera Tracking." ECCV 2016 Workshop on Benchmarking Multi-Target Tracking, Sep. 19, 2016, pp. 1-18.
Xperience Ai, "xperience/ai: We provide consulting in Computer Vision and Deep Learning." Jun. 12, 2018, 8 pages, [Online] [Retrieved on Aug. 30, 2023] Retrieved from the Internet <URL: https://www.xperience.ai/>.

* cited by examiner

MACHINE LEARNING MODEL FOR OCCUPANCY DETECTION

CROSS REFERENCE TO RELATED APPLICATIONS

This application claims a priority and benefit to U.S. Provisional Patent Application Ser. No. 63/328,430, filed Apr. 7, 2022, which is incorporated by reference.

FIELD OF THE INVENTION

The present disclosure relates generally to occupancy detection, and specifically to occupancy detection using thermal imagery.

BACKGROUND

Detecting and tracking floor, room, or desk occupancy is useful in security systems as well as other applications. Traditional methods of occupancy detection include using a camera and providing images from the camera to a remote location for human or machine analysis to identify people in the field of view. These methods, however, lack privacy measures as they take in identifiable images of people in the room and transmit those images (e.g., across an internet connection) to a processing site. As such, the images are vulnerable to being intercepted by unauthorized parties and the identities of the people in the room are then revealed to those parties. In addition, these methods and the underlying technologies are expensive.

SUMMARY

Embodiments of the present disclosure relate to a system and method for determining an occupancy of a room. The object detection system may include a thermal camera, sensor array, transceiver, central processing unit (CPU), memory, occupancy detection module, and network connection module. The thermal camera may capture thermal data which includes heat signatures generated by objects present in the room. The thermal data may be provided as input to the occupancy detection module. The occupancy detection module may preprocess the thermal data to convert the raw data into a usable data format for use by other modules and may apply an algorithm to increase image clarity and reduce noise in the data. The occupancy detection module may train and apply object detection machine-learned models to the thermal data to predict heat signatures generated by humans. The heat signatures with a high confidence score indicating it is generated by a human will be identified by a bounding box. The occupancy detection module may keep track of the bounding boxes in a room across sequentially captured images. The occupancy detection module may calculate location vectors for each bounding box, the location vectors used to compare against one or more object criteria. The occupancy detection system determines the occupancy count based on the number of bounding boxes. The occupancy detection system may broadcast the occupancy of the room over the network to one or more client devices. Processing may be performed on the network edge such that no data other than the determined occupancy count is transmitted via a Bluetooth low energy network and therefore less vulnerable to interception by bad actors.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed. It is noted that wherever practicable similar or like reference numbers may be used in the figures and may indicate similar or like functionality.

Embodiments relate to an occupancy detection system for determining a number of occupants in a room. The object detection system may include a thermal camera, sensor array, transceiver, central processing unit (CPU), memory, occupancy detection module, and network connection module. The thermal camera may capture thermal data which includes heat signatures generated by objects present in the room. The thermal data may be provided as input to the occupancy detection module. The occupancy detection module may include a preprocessing module, a model training engine, an object detection engine, and an object tracking module. The preprocessing module may preprocess the thermal data to convert the raw data into a usable data format for use by the object detection engine and/or the object tracking module. The preprocessing module may apply an algorithm to increase image clarity and reduce noise in the data. The model training engine may be configured to train machine-learned models using one or more sets of training data, which may include images of heat signatures generated by a variety of non-human objects and humans.

The output of the preprocessing module may be provided as input to the object detection engine, which may apply trained machine-learned models to the thermal data to predict heat signatures generated by humans. The heat signatures with a high confidence score indicating it is generated by a human will be identified by a bounding box. The object tracking module keeps track of the bounding boxes in a room across sequentially captured images. The object tracking module may assign a unique identification number to each bounding box. The object tracking module may calculate location vectors for each bounding box, the location vectors used to compare against one or more object criteria.

The occupancy detection system determines the occupancy count based on the number of bounding boxes. The occupancy detection system may broadcast the occupancy of the room over the network to one or more client devices.

System Overview

Figure 1:
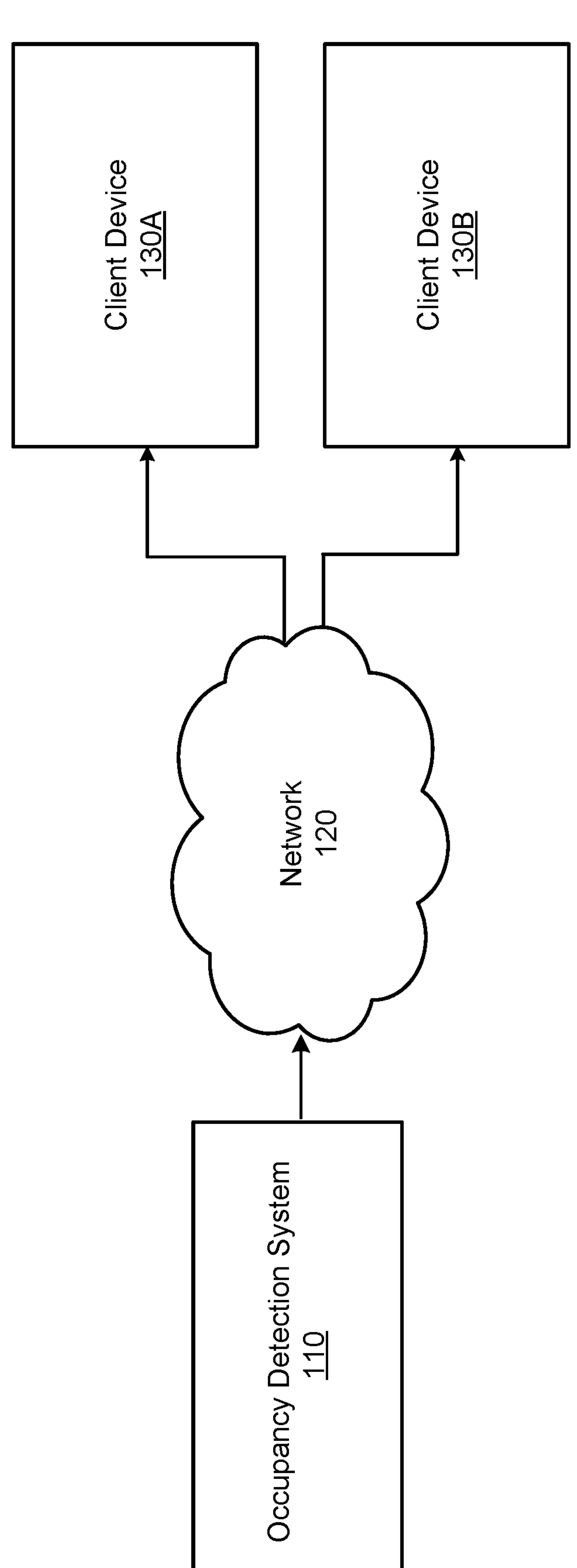
FIG. 1 is a high-level block diagram illustrating a system environment for an occupancy detection system, in accordance with one embodiment.

FIG. 1 is a high-level block diagram illustrating a system environment 100 for an occupancy detection system 110, in accordance with one embodiment. The system environment 100 shown by FIG. 1 includes one or more client devices 130A, 130B (collectively referred to as 130), a network 120, and an occupancy detection system 110. In alternative configurations, different and/or additional components may be included in the system environment 100.

The client devices 130 may be computing devices that display information to users and communicate user actions to the systems of the system environment 100. While two client devices 130A, 130B are illustrated in FIG. 1, in practice many client devices 130 may communicate with the system environment 100. In one embodiment, a client device 130 is a conventional computer system, such as a desktop or laptop computer. Alternatively, a client device 130 may be a device having computer functionality, such as a personal digital assistant (PDA), a mobile telephone, a smartphone or another suitable device. A client device 130 is configured to communicate via a network 120, which may comprise any combination of local area and/or wide area networks, using both wired and/or wireless communication systems.

In one embodiment, a client device (e.g., 130A, 130B) executes an application allowing users of the client device to interact with the system environment 100 of FIG. 1. For example, a client device 130A can execute a browser application to enable interaction between the client device 130A and the occupancy detection system 110 via the network 120. In another embodiment, the client device 130A interacts with the system environment 100 through an application programming interface (API) running on a native operating system of the client device 130A, such as WINDOWS®, IOS®, or ANDROID™.

The network 120 may serve to communicatively couple the client devices 130A, 130B, and the occupancy detection system 110. The network 120 may comprise any combination of personal area, local area, and/or wide area networks, using wired and/or wireless communication systems.

In some embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The occupancy detection system 110 may be a computing device that is configured to determine a number of occupants in a room using a thermal camera and broadcast the result to one or more client devices 130. The occupancy detection system 110 may be configured to capture thermal data in the room using a thermal camera, the thermal data including heat signatures generated by objects present in the room. An object may be a human or a non-human object. The occupancy detection system 110 may be configured to identify and count heat signatures generated by humans using machine learning techniques. The occupancy detection system 110 may be broadcast the occupancy of the room over the network 120 to one or more client devices 130.

Example Occupancy Detection System

Figure 2:
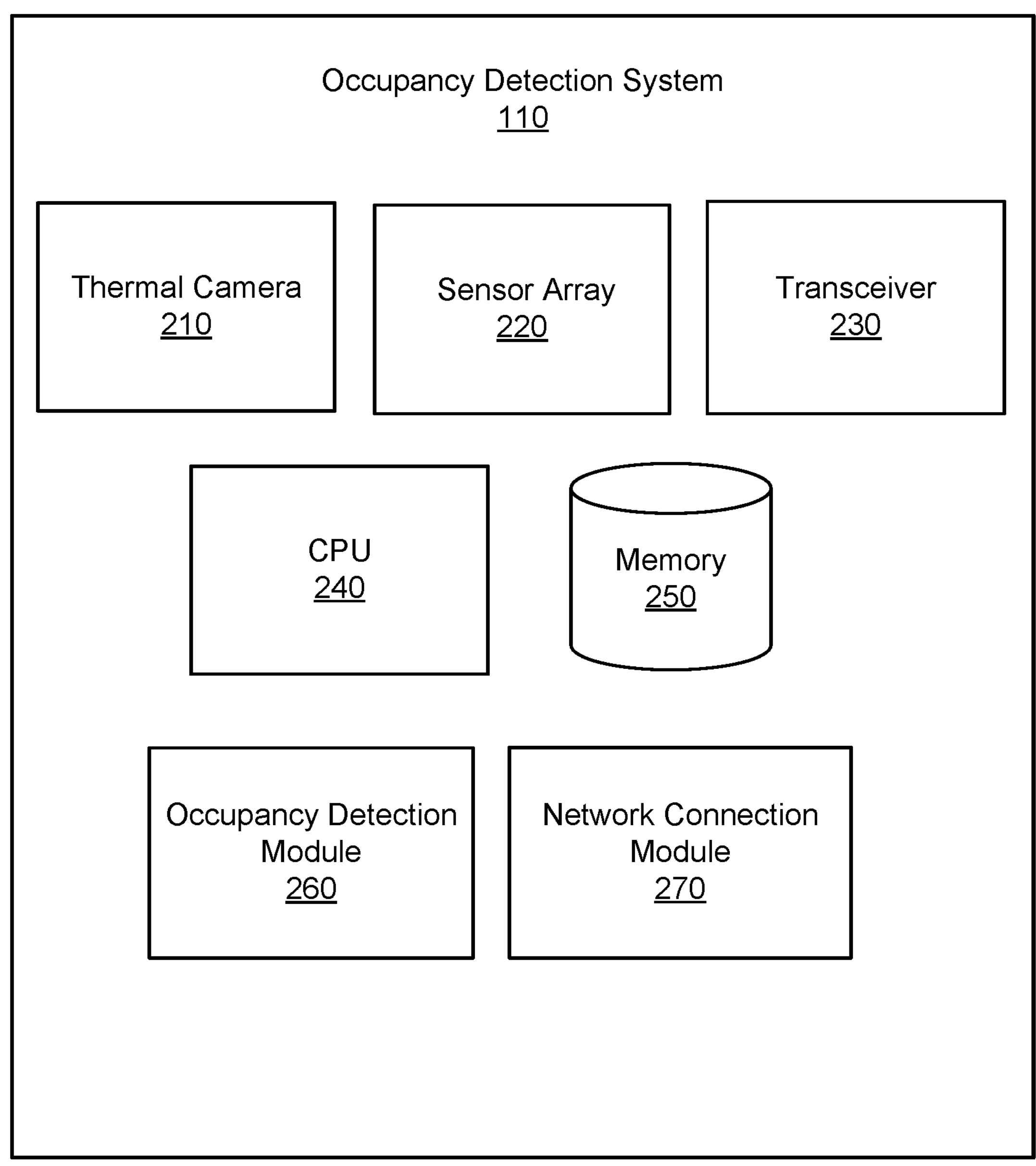
FIG. 2 is a block diagram of the occupancy detection system, in accordance with one embodiment.

FIG. 2 is a block diagram of the occupancy detection system, in accordance with one embodiment. The occupancy detection system 110 may include a thermal camera 210, a sensor array 220, a transceiver 230, a central processing unit (CPU) 240, a memory 250, an occupancy detection module 260, and a network connection module 270. In other embodiments, the occupancy detection system 110 includes different or additional components. In addition, the functions may be distributed among the components in a different manner than described.

The thermal camera 210 is configured to capture thermal image data of an environment within its field of view (FOV). In one embodiment, the thermal camera 210 is configured to have a wide FOV so that it may capture data over a large area. For example, the thermal camera 210 may have a FOV between 90 and 150 degrees. The thermal camera 210 may be constantly recording at a frame rate (e.g., sixty frames per second) or may be programmed to capture thermal data at a set sampling rate dependent on the use case. For example, the thermal camera 210 can be programmed to capture thermal data within its field of view once per second. The data output from the thermal camera 210 includes pixel values representing a representing a relative heat value for each pixel. In some embodiments, this data is output as a matrix or comma separated values (CSV) rather than as an image or heatmap and is preprocessed to create a visual representation of the data.

The thermal camera 210 may be mounted at a height determined by the resolution required for the use case of the occupancy detection system 110. For example, the thermal camera 210 may be mounted four meters (or more) off the ground in situations where the accuracy of the occupancy count is not highly valued. If the occupancy detection system 110 is being used to determine whether a room is occupied, an exact number of occupants is not necessary so the thermal camera 210 may be mounted higher to capture a larger area at the risk of miscounting two people standing close together as one. In situations in which a more exact count of the occupancy of a room is required, the thermal camera 210 may be mounted lower (e.g., three meters from the ground) to enable more accurate capture of distinct heat signatures. In some embodiments of the occupancy detection system 110, more than one thermal camera 210 may be placed in a room to cover a larger area of the room. The occupancy detection module 260 may then pre-process the data from each of the thermal cameras 210 to account for any overlap in the corresponding fields of view to enable accurate detection of occupancy without double counting. Accounting for overlap in corresponding fields of view of two or more thermal cameras is further described in FIG. 6 below.

A sensor array 220 of the occupancy detection system 110 is configured to gather data about additional characteristics of the environment in which the system 110 is functioning. The sensor array 220 may include additional sensors, such as a motion sensor, a visible light sensor, a sound sensor (e.g., a microphone), a temperature sensor, or a humidity sensor, etc. In some embodiments, data from the additional sensors may be used to indicate when the thermal camera 210 should be turned on. For example, the thermal camera 210 may be turned on when the lights are turned on and/or motion is detected within the room.

The transceiver 230 is configured to transmit and receive signals via one or more of RF, IR, and Bluetooth Low Energy (BLE).

The memory 250 may be configured to store thermal data from the thermal camera 210, and instructions required by the CPU to operate the occupancy detection system to perform occupancy detection. The memory 250 may also store other data relevant to the operation of the occupancy detection system 110.

The CPU 240 may be configured to execute a set of instructions stored in memory 250. The set of instructions, when executed by the CPU 240, may cause the CPU 240 to carry out processes that instruct the thermal camera 210 to capture thermal data of the environment within its FOV, and instruct the occupancy detection module to process the captured thermal data. The CPU 240 may execute machine learning algorithms.

The occupancy detection module 260 may include one or more machine learning models that take in data from a thermal camera 210 of the occupancy detection system 110 and process the thermal data to determine an occupancy of a room in which the occupancy detection system 110 is placed. In one embodiment, the occupancy detection module 260 preprocesses the thermal data (e.g., by removing noise). The occupancy detection module 260 may also remove heat signatures determined to be from non-human objects, such as computers, to more accurately determine the occupancy. The occupancy detection module 260 is described further in reference to FIG. 2.

The network connection module 270 allows the occupancy detection system 110 to transmit and receive data via Bluetooth LE or the internet. In some embodiments, the network connection module 270 is a connection to a Bluetooth LE enabled access point through which the internet can be reached. In other embodiments, other forms of network connections may be used by the network connection module 270.

Figure 3:
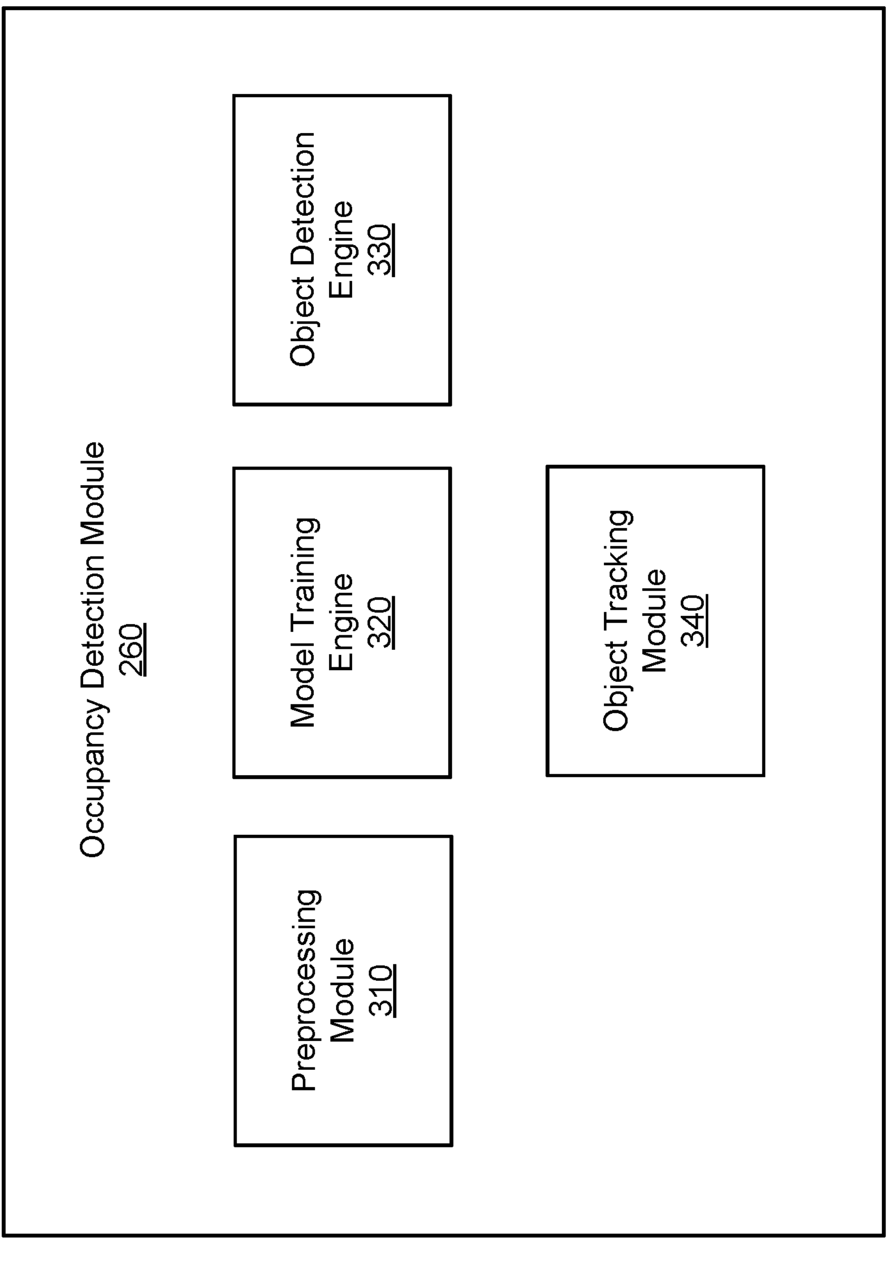
FIG. 3 is a block diagram of an occupancy detection module of the occupancy detection system in accordance with one embodiment.

FIG. 3 is a block diagram of an occupancy detection module 260 of the occupancy detection system 110, in accordance with one embodiment. The occupancy detection module 260 may be configured to identify, from captured thermal data, a number of occupants in a room using machine learning methods. The occupancy detection module 260 may include a preprocessing module 310, a model training engine 320, an object detection engine 330, and an object tracking module 340. Some or all of the modules of the occupancy detection module 260 may include machine learning models such as neural networks. The machine learning models may be trained during manufacturing of the occupancy detection system 110, during use of the occupancy detection system 110, or both. In other embodiments, the occupancy detection system 110 includes different or additional components. In addition, the functions may be distributed among the components in a different manner than described.

The preprocessing module 310 may be configured to receive thermal data output by the thermal camera 210 and process the thermal data into a form that is usable by the object detection engine 330 and object tracking module 340. In some embodiments, the thermal data output by the thermal camera 210 may be a matrix of pixel values, each value reflecting a relative heat of the area in the room represented by that pixel. In other embodiments, the thermal camera 210 may not generate a uniform image representation. The preprocessing module 310 may apply one or more preprocessing algorithms to the thermal data. The preprocessing algorithms may be applied to the thermal data to transform raw thermal data into data that is in a usable format or ready for processing, for use in training a machine learning model, or for use in applying a machine-learned model to for determining room occupancy.

In some embodiments, thermal images generated by the thermal camera may include unnecessary data or noisy data. The preprocessing module 310 extracts the most valuable information to make people (and other objects) more detectable in the image. For example, some thermal cameras 210 use a fisheye lens to capture a wide range of the room within the field of view, but the fisheye lens results in low resolution near the edges. As such, the preprocessing module 310 may crop the image to remove areas of lowest resolution at the edges. Additionally or alternatively, the preprocessing module 310 may process the images to reduce noise, such as compensating for horizontal and/or vertical stripes resulting from scanning properties of the camera.

The preprocessing module 310 may be configured to remove noise patterns or artifacts caused by the thermal camera 210 to improve image clarity. For example, the thermal camera may generate a sequence of output thermal images that has a pattern of vertical or horizontal lines across the image. The preprocessing module 310 may identify the lines in the image and remove them to create a clearer thermal image. In some embodiments, original images have horizontal and/or vertical lines of different brightness. These lines may be removed by calculating the medians of each line and/or each column and subtracting the calculated medians from the lines and columns correspondingly.

The preprocessing module 310 may be further configured perform another method for denoising, which includes estimating noise using the difference between neighboring lines/columns. Such lines/columns contain similar information regarding warm objects and useful details, so the median of difference between them is a good estimation of relative difference in their brightness. For example, the medians of a first line and a first column are computed as values used for correction as edge elements do not include much detail. For other lines and columns, relative differences in brightness are calculated. The final absolute correction values are computed for each line and column as a cumulative sum of relative correction values and subtracted from lines and columns.

In some embodiments, the lens of the thermal camera 210 may be scratched or smudged. The preprocessing module 310 may detect that over time and remove any noise caused by the scratch or smudge. Some image sensors may be critically sensitive to ambient temperature changes, causing neighboring pixels to drastically change response characteristics and resulting in an incoherent response of the sensor, where the image appears as being pixelated beyond recognition. A corrective temperature of the sensor is calculated on each thermal image to apply a correction to the oversensitive pixels to control this effect. Damaged pixels have a defective response to temperature changes, staying dark or overexposed when neighboring pixels change linearly in response to temperature changes. Such pixels are marked as bad, and their effect ignored/limited when filtering the image and computing the corrective sensor temperature.

In some situations, the thermal image may lack contrast that allows for heat signatures to be detected. The preprocessing module 310 may be configured to normalize the pixel values of the thermal image to have a uniformly scaled range and increase the contrast. For example, the preprocessing module 310 may scale the pixel values to be between 0 and 1 using min-max scaling and mathematically process the values to be spread across a symmetrical range having a lightest color pixel value and a darkest color pixel value at the extremes of the symmetrical range. The preprocessing module 310 may perform additional functions to create a functional output. In some embodiments, the output of the preprocessing module 310 has been processed such that a human eye can determine the locations of heat signatures in the output image.

The preprocessing module 310 may calibrate original thermal images to reduce non-uniformity and temperature variations of the camera. The calibration of thermal images may be done by subtracting an offset from the raw image. The offset is an image of a uniform temperature scene recorded in the "black" environment (e.g., an image without any warm objects). Due to change in the temperature during calibration image recording and actual environment in real use-case, images can have additional noise. In raw pixel values, there may be outliers from both left and right sides of a distribution. To remove these outliers and squeeze the distribution, the preprocessing module 310 may select only pixels bounded by the interquartile distance multiplied by a fixed constant.

Other examples of data processing operations may include filtering out outlier data points, fixing formatting errors, removing duplicate data points, other image processing operations, or any other suitable operations.

Example Object Detection Engine

The model training engine 320 may be configured to train one or more machine-learned models using one or more sets of training data. The machine-learned models trained by the model training engine 320 may be stored in the memory 250, where they may be accessed by the object detection engine 330. A set of training data may include an extensive collection of thermal images which may be labeled to indicate the location of a heat signature, and the type of the object which is the source of the heat signature. The object may have an object type of human or non-human. For example, a thermal image used for training may depict a heat signature generated by a laptop, with a location of the laptop indicated by a ground truth bounding box. In another example, a thermal image may depict the heat signature generated by a human, and the location of the human is indicated by a ground truth bounding box. The model training engine 320 may train the machine learning models on the one or more sets of training data to accurately identify the location of an object's heat signature and predict the corresponding object type based in part on the heat signature of the object.

In some embodiments, the machine-learned models may be trained on one or more sets of images showing objects and floors exposed to direct sunlight. The machine-learned models may also be trained on one or more sets of images depicting human heat signatures after being in the cold during the winter. Using ambient temperature measurements and some image thermal characteristics, the machine-learned model can eliminate objects which are artificially overexposed, such as a non-human object that may increase in temperature during the day due to the sun, or conversely, when people enter a room from being outside in the cold.

In other embodiments, users of the occupancy detection system 110 can add data to this library to improve the ability of the object detection engine 330 to identify object types and location of objects within a thermal image. For example, a user may place a warm object such as a laptop or cup of tea in an area within the FOV of the thermal camera 210. The user can provide an input to the system 110 indicating that this object is non-human, and its heat signature should be saved to the library of recognized heat signatures for the model training engine. A user may repeat this process with different objects displayed in several orientations within the FOV of the thermal camera 210 to add additional heat signatures to the library.

In some embodiments, the model training engine 320 may train or retrain the machine-learned models in advance of a request for use by a user, in response to a request for use by a user, periodically (after the passage of an interval of time), or in response to an event or criteria being satisfied (e.g., a request by a user, an above-threshold change in data values, and the like).

The object detection engine 330 implements one or more object detection models to identify a location of a heat signature and predict the type of an object which generated the heat signature. The object detection engine 330 may receive a thermal image output from the preprocessing module 310 and apply one or more machine-learned models to the thermal image. The object detection engine 330 can access pre-trained machine-learned models from the memory 250 or may train new machine-learned models via the model training engine 320 (e.g., for subsequent storage in the memory 250). The machine-learned object detection models (or simply "object detection model") described herein may be trained using various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof. Some neural networks may include single shot detector (SSD) algorithms, MobileNetV2, crowd counting algorithms, or any suitable combination thereof.

The object detection model may perform feature extraction on the input thermal image to encode features of the thermal image at different scales (e.g., sizes) and produce feature maps of different granularity. This allows the object detection model to detect objects in the thermal images at different scales. The object detection model may use a filter in a sliding window technique across the thermal image to identify the heat signature. The size of the filter and the stride of the filter may change over the course of performing inference. The object detection model may use the features in the feature map to produce more accurate localization of the heat signatures.

The object detection model may generate a prediction corresponding to an object in the thermal image. A prediction may include a bounding box around an object within the thermal image, and a confidence score for each class (e.g., type) of object. The bounding box may be a four-sided polygon having its sides a fixed distance away from a center point of the heat signature or, in other embodiments, be an irregular shape based on the shape of the heat signature. The confidence score indicates the probability that the model's prediction is correct. The object detection model may use extracted characteristics of the thermal image, such as the size and shape of the heat signature, and/or by using information representative of the heat signature to predict an object type. Some classes may include image background, human, and non-human. For example, the object detection model may determine that a heat signature generated by a human object have a higher calculated confidence score for the human class compared to the calculated confidence score for the non-human class.

In some embodiments, the object detection model may generate bounding boxes around all identified heat signatures, each bounding box labeled with the object's type. In other embodiments, the object detection model may generate bounding boxes only around heat signatures generated by a certain type of object. For example, the object detection model may be configured to generate bounding boxes only around human heat signatures.

The object detection model may include a post-processing stage (e.g., non-max suppression) that may remove duplicate predictions for the same heat signature. The object detection model may sort the predictions by confidence scores and may select the prediction with the highest confidence score. In some embodiments, the object detection model may produce an output thermal image with a bounding box around each predicted human in the thermal image. In other embodiments, the object detection model may produce an output thermal image with a bounding box around all heat signatures in the thermal image.

In addition, the architecture of the object detection model may be designed for mobile devices, to provide sufficient accuracy without an excessive number of layers or parameters. The object detection model may be quantized, such that each layer is optimized down to a smaller yet sufficiently accurate numerical representation via shift and rescaling. This reduces memory footprint of the model and the run time on an edge device which is optimized for small-scale arithmetic operations. The object detection model may use advanced vectorized arithmetic operations present on a multi-core CPU 240, which merges common operations together and improving computational throughput. The layers of the model and the associated data may be optimally piecewise pre-loaded into memory 250, so the next steps have the data already available to immediately calculate.

The object tracking module 340 may receive the thermal image output from the object detection engine 330 and tracks objects indicated by the bounding boxes. The object tracking module 340 tracks the location of each bounding box across sequential images. As the thermal images contain limited or no visual identification elements (e.g., colors of clothing worn by occupants or faces of occupants) the identity of each bounding box is kept track of by measuring the change in location of the bounding box in each image frame received by the object tracking module 340 from the object detection engine 330.

To implement object tracking, the object tracking module 340 may, assign a specific identification number (e.g., ID) to each identified person in the image (e.g., indicated by a bounding box) such that a unique person from a previous frame can be matched with a current frame. If a person left the frame and then reappeared near the same place in a short period of time (for example, one second or less after leaving), then they may be assigned the same ID as before. If a person is out of frame for a longer period of time (for example, for one second or more), the bounding box may be removed, and the ID is no longer used. It is possible that one person leaves the frame and then another person appears near the same place. In this case, the ID of the first person may be assigned to the second person due to lack of distinguishing visual features in the data from the thermal camera 210. The thermal camera 210 does not provide any additional information like textures, clothes color, etc. that can be used to distinguish between people. Warm objects that generate a similar heat signature to a human may be detected as a person and can influence tracking behavior.

In one embodiment, to reduce instances of erroneously identifying warm objects as people and identifying two separate people with the same ID, the object tracking module 340 uses a distance metric to estimate how close objects are to each other to match tracks between frames. Predictions with low probability that the predicted object is a person may be filtered to reduce the number of generated tracks (e.g., bounding boxes). If a previously detected track doesn't appear after a few frames (e.g., after one second), it may be removed.

In one embodiment, to reduce the number of false negatives, tracks are matched two times. First, confirmed tracks are matched with the filtered detections. Then, unconfirmed tracks (candidates in for bounding boxes) are matched with the unmatched detections with higher confidence. This may be solved by treating it as a classical linear assignment problem that uses a cost matrix of size N—number of existing tracks and M—number of detections. Each element in this matrix is a distance metric between previous track and current detections. The algorithm returns matches between tracks and detections which correspond to minimal cost. Objects that have too large of a distance between each other may be filtered with a maximal distance threshold. Pairwise squared distance between objects centers may be used as a distance metric. If the distance metric is bigger than a threshold value, then the objects are not matched. The value of the distance metric can be adjusted based on use case.

Figure 4A:
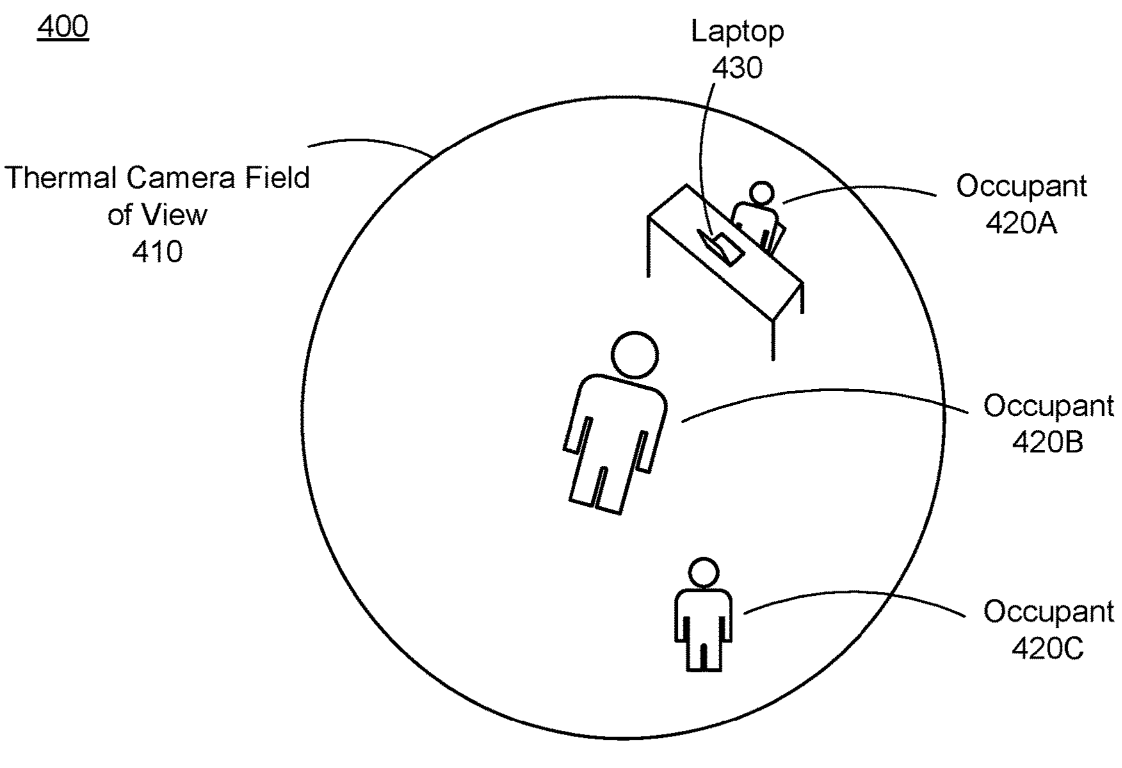
FIG. 4A is a conceptual diagram illustrating a field of view of a thermal camera of the occupancy detection system in accordance with one embodiment.

FIG. 4A is a conceptual diagram illustrating a FOV 410 of a thermal camera of the occupancy detection system in accordance with one embodiment. In one embodiment, the FOV 410 of the thermal camera 210 includes three occupants 420A, 420B, 420C (collectively referred to as 420), two standing and one sitting at a table with a laptop 430. The thermal camera 210 captures thermal data corresponding to its FOV 410, including the three occupants 420 as well as the laptop 430. The preprocessing module 310 removes noise and improve the contrast of the thermal data from the thermal camera 210. The object detection engine 330 may predict a location of an object and predict the type of the object. The object detection engine 330 places boundary boxes around heat signatures predicted to be human. The object tracking module 340 tracks the bounding boxes corresponding to the heat signature of each occupant.

Figure 4B:
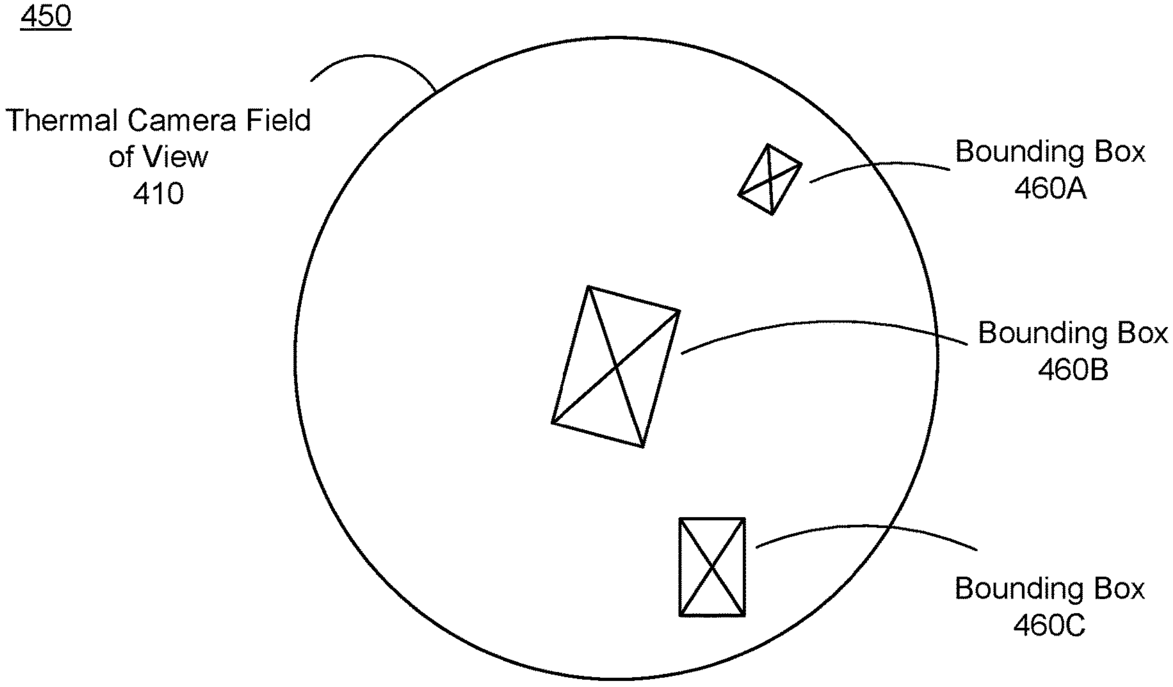
FIG. 4B is a conceptual diagram illustrating a processed output of the thermal camera having bounding boxes on heat signatures in accordance with one or embodiment.

FIG. 4B is a conceptual diagram illustrating a processed output of the thermal camera having bounding boxes on heat signatures in accordance with one or embodiment. The object detection engine placed bounding boxes 460A, 460B, 460C (collectively referred to as 460) around each detected human heat signature. While the laptop has a detectable heat signature, it may be identified as a non-human object by the object detection engine 330 and therefore does not have a bounding box 460.

Figure 5:
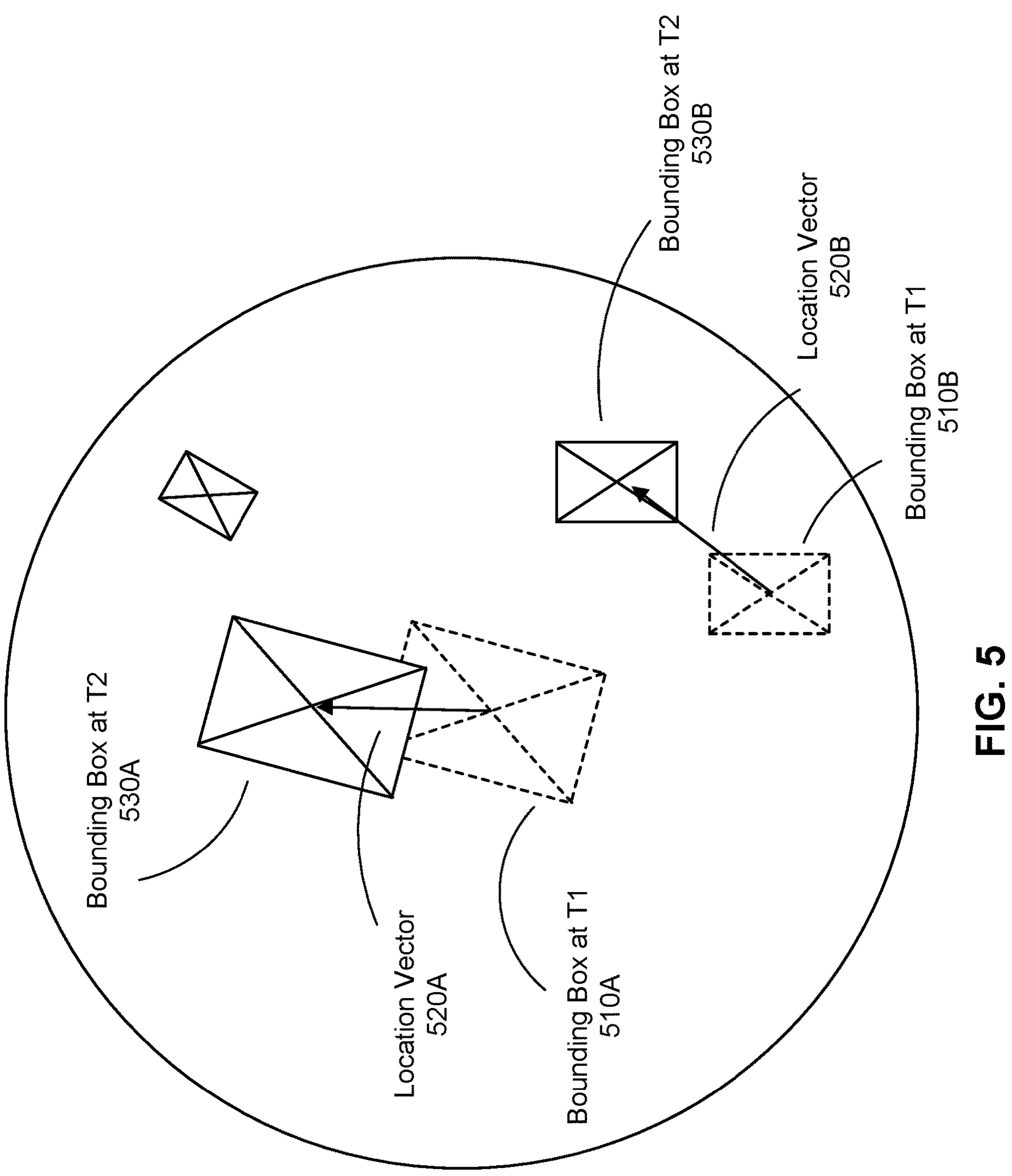
FIG. 5 is an illustration of heat signatures being tracked over time in accordance with one embodiment.

FIG. 5 is an illustration of heat signatures being tracked over time in accordance with one embodiment. The bounding boxes at time one (e.g., T1) 510A, 510B (e.g., collectively referred to as 510) represent bounding boxes in a first image captured at a first time, T1. The bounding boxes at time two (e.g., T2) 530 represent the same bounding boxes 510 but captured in a second image at a later time, T2. The location vectors 520A and 520B represent the distance and direction of the change in position of a center of a bounding box from T1 to T2. Note that the bounding box in the upper right, corresponding to the occupant at the table shown in FIG. 5, does not have a location vector (e.g., has a location vector with null values), as the center of that bounding box has not moved from T1 to T2.

The values of the location vectors 520*a* and 520*b* may include a distance, angle, and estimated speed of movement based on the distance moved and time elapsed between T1 and T2. In some embodiments, the location vectors may include additional values. The values of the location vector of each bounding box are compared to a set of criteria for identifying the object of each bounding box. For example, in some use cases a criterion exists indicating that any bounding box which has had a null location vector for a given interval of time should not be counted toward an occupancy count as it is determined to be an inanimate object. This example criterion removes objects from the occupancy count that the object detection engine 330 may not have recognized. In another example, a criterion may be set indicating a maximum speed at which an object can move to be counted in the occupancy count. For example, if a thermal camera 210 of the system 110 were set up in an outdoor area and a bird flew by, the bounding boxes detecting the bird at a first and second time period would have a large vector value representing distance moved due to the speed at which the bird is flying. The bounding box representing the bird would therefore not be counted toward the occupancy count. Other criteria can include restrictions on what locations a bounding box can be in (e.g., not counting bounding boxes having paths that intersect with walls or other unpassable objects) or angles at which a bounding box can move. A bounding box that passes all of the criteria is counted toward an occupancy count of the room. Criteria may be determined and changed based on the use case of the occupancy detection system 110.

Example Method

Figure 6:
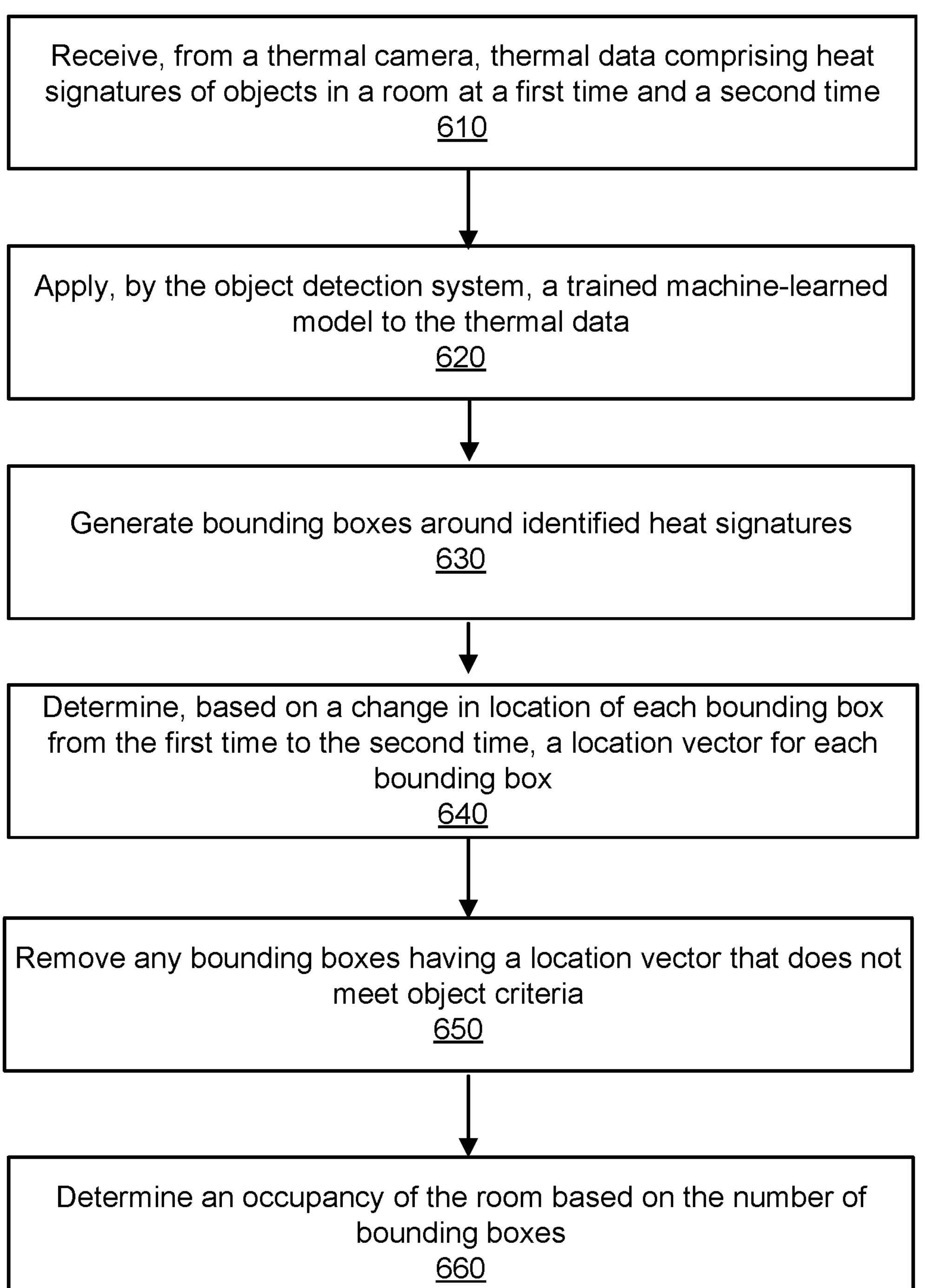
FIG. 6 is a flowchart of a method of determining an occupancy of a room in accordance with one embodiment.

FIG. 6 is a flowchart of a method of determining an occupancy of a room in accordance with one embodiment. In some embodiments, different or additional steps are included in method 600 to determine a count of the occupancy of a room. Furthermore, some of the steps may be performed in parallel or in a different order.

The occupancy detection system 110 receives 610, from a thermal camera 210, thermal data including heat signatures of objects in a room in which the thermal camera 210 is located. The thermal data includes data captured over a range of times including at least a first time and a second time, where the second time occurs after the first time. Preprocessing may be performed to convert the thermal data into an image at the time it was captured and denoise said image. However, in some embodiments, preprocessing is not necessary.

The occupancy detection system 110 provides, as input to the object detection engine, thermal data of the room. The object detection engine applies 620 a trained machine-learned model to the thermal data. The object detection engine may access trained machine-learned models stored in memory 250. The machine-learned model may predict the location of heat signatures within the thermal image. The object detection engine may calculate confidence scores for each of the heat signatures present in the thermal image, a confidence score indicating a probability that the heat signature is generated by an object of a specified type.

The object detection engine 330 may generate 630 bounding boxes around identified heat signatures. In some embodiments, the object detection engine 330 may only generate bounding boxes around heat signatures with a high confidence score for a human object type.

The occupancy detection system 110 determines 640, based on a change in the location of each bounding box, a location vector for each bounding box. The system 110 determines a location vector for each bounding box in the thermal data by comparing the thermal data at the first time to the thermal data at the second time and drawing a vector between the bounding boxes. In some embodiments, the vector connects a center of the bounding box at the first time to a center of the bounding box at the second time.

The occupancy detection system 110 removes 650 any bounding boxes having a location vector that does not meet certain object criteria. In some embodiments, if a bounding box violates a particular criterion, it may be determined to be a heat signature of two humans standing close together. The original bounding box would then be removed and replaced by two separate bounding boxes. The criteria are chosen based on the use case to decrease the incidence of false occupancy counts. For example, based on the installation height of the thermal camera, there is an expected range of bounding-box sizes which correspond to human dimensions. Bounding boxes failing to fall into the expected range might correspond to multiple people being erroneously placed together, or to moving objects being held by people when moving and can be thus removed. When the thermal camera 210 is positioned at a lower height, the people can be better recognized by their features (e.g. arms, head, shoulders) and assigned a higher confidence score, so the detection threshold can be raised appropriately to further limit the incidence of false positives. When the camera is mounted at a higher height, all objects much smaller than a typical person are automatically less detected, further improving detection accuracy.

The occupancy detection system 110 determines 660 an occupancy of the room based on the number of bounding boxes. In some embodiments determining the occupancy is a simple count of the number of bounding boxes in the room, while in other embodiments the occupancy of a room may be determined based on a function using the number of bounding boxes as an input. If more than one thermal camera is required to cover the whole room, there is a need to eliminate double counting on overlapped areas. In such areas, coordinates of bounding boxes are used to determine whether bounding boxes detected on different devices are the same person. This can be determined using installation geometry and room dimensions.

One or more of the modules in the occupancy detection module 260 are optimized to run on a device including the thermal camera 210 or connected via a wire to the thermal camera 210. This device may be a low-powered, low-resource device and may be configured to take output from the thermal camera 210 and process it with one or more of the modules of the occupancy detection module 260. By housing the thermal camera 210 and some or all of the modules of the occupancy detection module 260 on a single device, no images need to be transmitted via Instead, the device can receive thermal data from the local thermal camera 210, process it on the device, and transmit only a result (e.g., an occupancy of a room) to a target client device. This improves the security of the system 110 as no images are transmitted via Wi-Fi and therefore the risk of images being intercepted is reduced.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein, any reference to “one embodiment” or “an embodiment” means that a particular element, feature, structure, or characteristic described in connection with the embodiment is included in at least one embodiment. The appearances of the phrase “in one embodiment” in various places in the specification are not necessarily all referring to the same embodiment. Similarly, use of “a” or “an” preceding an element or component is done merely for convenience. This description should be understood to mean that one or more of the elements or components are present unless it is obvious that it is meant otherwise.

Where values are described as “approximate” or “substantially” (or their derivatives), such values should be construed as accurate+/−10% unless another meaning is apparent from the context. From example, “approximately ten” should be understood to mean “in a range from nine to eleven.”

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system, software embodied on a computer-readable medium, and a process for detecting occupancy in a room or other space. Thus, while particular embodiments and applications have been illustrated and described, it is to be understood that the described subject matter is not limited to the precise construction and components disclosed. The scope of protection should be limited only by any claims that may issue.

What is claimed is:

1. A method performed by an electronic device comprising a thermal camera and a computer integrated with the thermal camera or directly coupled to the thermal camera, the computer storing a quantized machine-learned object detection model, wherein (a) one or more layers of the quantized machine-learned object detection model were quantized via shift or rescaling, and (b) layers of the quantized machine-learned object detection model and associated data were piecewise pre-loaded, the method comprising:

- receiving, by the computer, thermal data from the thermal camera, the thermal data comprising a heat signature of an object present in a room;
- preprocessing, by the computer, the thermal data;
- identifying, by the computer executing the quantized machine-learned object detection model, the heat signature in the preprocessed thermal data generated by the object, and wherein the object has a type;
- generating, by the computer executing the quantized machine-learned object detection model, a bounding box around the heat signature;
- determining, by the computer executing the quantized machine-learned object detection model, the type of the object which generated the heat signature;
- determining, by the computer, an occupancy of the room based on a number of bounding boxes corresponding to objects of a specified type; and
- transmitting, by a Bluetooth transmitter of the computer, data indicative of the determined occupancy of the room to a client device external to the electronic device, wherein the data does not include the thermal data or the preprocessed thermal data.

2. The method of claim 1, wherein the thermal data from the thermal camera comprises thermal images captured in sequence, each thermal image further comprising a matrix of pixel values.

3. The method of claim 2, wherein preprocessing the thermal data from the thermal camera further comprises:

- removing noise from the thermal images; and
- normalize the pixel values of the thermal images.

4. The method of claim 1, wherein determining the type of the object which generated the heat signature comprises:

- accessing, by an object detection system, one or more captured thermal images including heat signatures generated by corresponding objects, each object having an object type; and
- applying, by the object detection system, the quantized machine-learned object detection model to the one or more captured thermal images to predict an object type and a location of objects within each thermal image, and to produce an associated confidence score representative of a prediction of the object type for each object.

5. The method of claim 4, wherein the quantized machine-learned object detection model was trained by a process comprising:

- accessing, by the object detection system, a set of training data, the set of training data comprising thermal images including heat signatures generated by corresponding objects; and
- training, by the object detection system, the quantized machine-learned object detection model using the set of training data, the quantized machine-learned object detection model configured to predict the object type associated with a heat signature and a location of the object within a thermal image.

6. The method of claim 5, wherein the set of training data comprises thermal images including heat signatures of human and non-human objects.

7. The method of claim 2, further comprises tracking a path of the heat signature of the object using more than one thermal image captured in sequence.

8. The method of claim 7, wherein tracking a path of the heat signature of the object using the more than one thermal image captured in sequence further comprises:

- receiving a first thermal image indicating a location of the bounding box associated with a first time,
- receiving a second thermal image indicating a location of the bounding box associated with a second time,
- assigning a unique identification number to the bounding box in the first thermal image;
- calculating a distance traveled by the bounding box, based in part on the location of the bounding box from the first time to the second time; and responsive to the distance traveled meeting a predefined distance criterion, assigning the unique identification number to the bounding box in the second thermal image.

9. The method of claim 8, further comprising determining a location vector for the bounding box, based in part on a change in location of the bounding box from the first time to the second time; and wherein determining a location vector for the bounding box further comprises removing bounding boxes having a location vector that does not meet an object criterion.

10. The method of claim 1, wherein:

the thermal data received by the computer from the thermal camera is not received via Wi-fi or over an internet connection; and the data indicative of the determined occupancy of the room transmitted to the client device is not transmitted via Wi-fi.

11. An electronic device comprising:

a thermal camera configured to capture thermal data; and a computer integrated with the thermal camera or directly coupled to the thermal camera, the computer comprising: a set of one or more computer processors; and a computer readable medium storing:

a quantized machine-learned object detection model, wherein (a) one or more layers of the quantized machine-learned object detection model were quantized via shift or rescaling, and (b) layers of the quantized machine-learned object detection model and associated data were piecewise pre-loaded; and instructions that when executed by the set of one or more computer processors causes the computer to:

receive thermal data from the thermal camera, the thermal data comprising a heat signature generated by an object present in a room;

preprocess the thermal data;

execute the quantized machine-learned object detection model on the preprocessed thermal data to:

identify the heat signature in the preprocessed thermal data generated by the object, and wherein the object has a type;

generate a bounding box around the heat signature; and determine the type of the object which generated the heat signature;

determine an occupancy of the room based on a number of bounding boxes corresponding to objects of a specified type; and transmitting, by a Bluetooth transmitter of the computer, data indicative of the determined occupancy of the room to a client device external to the electronic device, wherein the data does not include the thermal data or the preprocessed thermal data.

12. The electronic device of claim 11, wherein the thermal data from the thermal camera comprises one or more thermal images captured in sequence, each thermal image further comprising a matrix of pixel values.

13. The electronic device of claim 12, wherein the instructions that cause the set of one or more computer processors to preprocess the thermal data from the thermal camera comprises instructions that when executed by the set of one or more computer processors, cause the set of one or more computer processors to perform one or more of:

removing noise from the one or more thermal images; or normalize pixel values of the one or more thermal images.

14. The electronic device of claim 11, wherein the instructions that causes the set of one or more computer processors to determine the type of the object which generated the heat signature comprises, comprises instructions that when executed by the set of one or more computer processors, cause the set of one or more computer processors to:

access, by an object detection system, one or more captured thermal images including heat signatures generated by corresponding objects, each object having an object type; and apply, by the object detection system, the quantized machine-learned object detection model to the one or more captured thermal images to predict an object type and a location of objects within each thermal image, and to produce an associated confidence score representative of a prediction of the object type for each object.

15. The electronic device of claim 14, wherein the quantized machine-learned object detection model was trained by a process comprising:

access, by the object detection system, a set of training data, the set of training data comprising thermal images including heat signatures generated by corresponding objects; and train, by the object detection system, the quantized machine-learned object detection model using the set of training data, the quantized machine-learned object detection model configured to predict the object type associated with a heat signature and a location of the object within a thermal image.

16. The electronic device of claim 15, wherein the set of training data comprises thermal images including heat signatures of human and non-human objects.

17. The electronic device of claim 12, wherein the computer readable medium further comprises instructions that when executed by the set of one or more computer processors, cause the set of one or more computer processors to:

track a path of the heat signature of the object using the one or more thermal images captured in sequence.

18. The electronic device of claim 17, wherein the instructions that causes the set of one or more computer processors to track a path of the heat signature of the object using the one or more thermal images captured in sequence, further comprises instructions that when executed by the set of one or more computer processors, cause the set of one or more computer processors to:

receive a first thermal image indicating a location of the bounding box associated with a first time, receive a second thermal image indicating a location of the bounding box associated with a second time, assign a unique identification number to the bounding box in the first thermal image;

calculate a distance traveled by the bounding box, based in part on the location of the bounding box from the first time to the second time; and responsive to the distance traveled meeting a predefined distance criterion, assigning the unique identification number to the bounding box in the second thermal image.

19. The electronic device of claim 11, wherein execution of the quantized machine-learned object detection model by the computer comprises the computer performing vectorized arithmetic operations.

20. One or more non-transitory computer readable mediums storing:

a quantized machine-learned object detection model, wherein (a) one or more layers of the quantized machine-learned object detection model were quantized via shift or rescaling, and (b) layers of the quantized machine-learned object detection model and associated data were piecewise pre-loaded; and instructions that, when executed by a computer integrated with a thermal camera or directly coupled to the thermal camera, cause the computer to perform operations comprising:

receiving, by the computer, thermal data from the thermal camera, the thermal data comprising a heat signature of an object present in a room;

preprocessing, by the computer, the thermal data;

identifying, by the computer executing the quantized machine-learned object detection model, the heat signature in the preprocessed thermal data generated by the object, and wherein the object has a type;

generating, by the computer executing the quantized machine-learned object detection model, a bounding box around the heat signature;

determining, by the computer executing the quantized machine-learned object detection model, the type of the object which generated the heat signature;

determining, by the computer, an occupancy of the room based on a number of bounding boxes corresponding to objects of a specified type; and transmitting, by a Bluetooth transmitter of the computer, data indicative of the determined occupancy of the room to a client device external to the computer, wherein the data does not include the thermal data or the preprocessed thermal data.

* * * * *